United States Patent [19]

Hayashi et al.

[11] Patent Number: 4,703,679

[45] Date of Patent: Nov. 3, 1987

[54] APPARATUS AND METHOD FOR SELECTIVELY DETERMINING ORIENTATION OF DOUGH PIECES

[75] Inventors: Torahiko Hayashi; Hirobumi Mugishima; Michio Morikawa, all of Utsunomiya, Japan

[73] Assignee: Rheon Automatic Machinery Co., Ltd., Japan

[21] Appl. No.: 153,613

[22] Filed: May 27, 1980

[30] Foreign Application Priority Data

May 24, 1979 [JP] Japan .................................. 54-64272

[51] Int. Cl.⁴ .............................................. B26D 7/06
[52] U.S. Cl. ......................................... 83/102; 83/24; 198/400; 209/542
[58] Field of Search ............... 99/450.2; 425/319–322, 425/315–316; 426/500, 501, 503; 198/400, 617; 209/542, 544, 545; 83/102, 104–107, 109, 110, 166, 24, 27

[56] References Cited

U.S. PATENT DOCUMENTS

| | | | |
|---|---|---|---|
| 1,669,087 | 5/1928 | Hungerford | 198/400 |
| 2,584,526 | 2/1952 | Albertoli | 198/400 |
| 2,739,544 | 3/1956 | Groff | 83/105 |
| 3,427,910 | 2/1969 | Zempel | 83/107 |
| 3,680,616 | 8/1972 | Rejsa | 83/107 |
| 3,702,655 | 11/1972 | Cox | 198/400 |
| 3,756,368 | 9/1973 | Lent | 198/400 |
| 4,318,678 | 3/1982 | Hayashi et al. | 425/301 |

Primary Examiner—E. R. Kazenske
Attorney, Agent, or Firm—Guy W. Shoup

[57] ABSTRACT

In an apparatus and method for selectively determining the orientation of dough pieces, dough pieces are made to fall from an upper conveyor passing around a curved end portion formed at the downstream end thereof. The falling dough pieces hit a bar positioned underneath the curved end portion and land on a lower conveyor positioned under the bar with the orientation reversed or unchanged depending upon whether the dough piece rides on the forward or the rearward side of the bar.

14 Claims, 7 Drawing Figures

APPARATUS AND METHOD FOR SELECTIVELY DETERMINING ORIENTATION OF DOUGH PIECES

BACKGROUND OF THE INVENTION

The present invention relates to an apparatus and method selectively determining the orientation of dough pieces. More particularly, it relates to the changing of the orientation of dough pieces as desired while they are transferred from a first conveyor onto a second conveyor. Furthermore, the present invention relates to an apparatus and method for producing from a web of dough a plurality of dough pieces of the same orientation to be processed for confectionery, bread and the like and reversing the orientation of any of the rows of dough pieces when they are transferred from one conveyor onto another, while maintaining the orientation of other rows of dough pieces unchanged.

In producing croissants or rolls successively by a forming device, dough pieces usually having a triangular configuration are prepared in advance and thereafter rolled up from the bases of the triangular dough pieces. The operation of preparing dough pieces is usually performed by cutting a broad dough sheet into triangularly shaped pieces.

Conventionally, in order to mass produce dough pieces while minimizing losses of dough, a continuously supplied web of dough is successively cut to provide two kinds of rows containing a plurality of substantially isosceles-triangular pieces of the same size, all of the triangles of each row having the bases aligned either transversely of, or in parallel with, the direction of advancement of the web, the triangles of adjacent rows facing in opposite directions. Therefore, in order to roll up the triangular pieces mechanically and continuously from the bases thereof, it is firstly necessary to reverse the orientation of the rows of dough pieces whose bases are positioned at the trailing end, thereby making the orientation of all the pieces uniform.

Such operation, heretofore, has been carried out by mechanically picking up and turning those pieces which are located on every other row by 180° or 90°, as the case may be, with respect to the direction of advancement of the web. The conventional operation, however, has disadvantages in that a high speed operation cannot be performed and furthermore it requires a very complex mechanism.

In the production of buttered rolls, biscuits and similar dough products, dough sheets may be cut into rectangular dough pieces, some of which may be overturned upside down, in the production line, to undergo various processes. In order to accomplish the overturning operation, it becomes necessary, in the conventional methods, to pick up relevant dough pieces, change the orientation and to replace them onto the conveyor on which they are processed. The operation leaves room for improvements.

SUMMARY OF THE INVENTION

An object of the present invention is to provide an apparatus method for selectively determining the orientation of dough pieces in a simple manner. Another object of the present invention is to provide an apparatus method for producing from a web of dough sheet a plurality of dough pieces of the same orientation and changing the orientation of all or any of the rows of dough pieces cut from the web, at high speeds and with a simple mechanism.

According to the present invention, there is provided an upper conveyor for conveying dough pieces supplied thereon, said conveyor terminating at a curved end portion at the downstream end thereof, a member such as a bar or roller presenting an upper surface elevated in the center and sloping downwardly on each side and positioned underneath said curved end portion parallel to the outermost end of said curved end portion at a location receiving the falling dough pieces so as top permit the dough piece to move along either of the sloping surfaces depending on the relationship between the center of gravity of the dough piece and the location of the bar. A lower conveyer is positioned under the bar, whereby, in use, the dough piece made to move along the upper surface of the bar lands on the lower conveyor with the orientation reversed or unchanged depending upon which sloping surface of the bar the dough piece moves along The configuration of dough pieces cut in the present invention is not limited to triangular. It may be rectangular, trapezoidal and can be of any other configuration.

In the present invention, dough pieces are transferred from a conveyor onto a different conveyor positioned thereunder. The downstream end of the upper conveyor forms a curved end portion. The curved end portion may be formed by the forward end surface of the downstream end roller and the conveyor belt passing thereover, but it may be formed with a conveyor belt wound around any other suitable support providing the configuration of a curve in cross-section. The dough pieces on the upper conveyor are thus made to fall successively around the curved end portion in the direction of the lower conveyor.

The bar is provided underneath the curved end portion of the upper conveyor and above the receiving lower conveyor. The bar extends horizontally over a portion or the entire width of the upper conveyor in parallel with the curved end portion, namely, perpendicularly to the direction of movement of the upper conveyor. The bar presents an upper surface elevated in the center and having downward sloping surfaces on each side of the elevation. The bar can be in the form of a cylinder. The bar may be stationary or may move horizontally back and forth. It may also rotate. In case the bar takes the form of cylinder, it may rotate continuously or intermittently. When it is made to rotate continuously, it may preferably rotate in the direction of the movement of the upper conveyor. When the roller rotates, the peripheral speed may preferably be substantially lower than the speed of movement of the upper conveyor. The bar may oscillate forwardly and rearwardly. The more specific linear and rotational movements of the bar or cylinder may be determined by various factors explained hereinafter.

The specific position of the bar may be determined by the consideration as to the relationship with the center of gravity of the dough piece. Assuming that the bar is stationary, if the center of gravity of the dough piece is rearward of the elevated portion of the upper surface of the bar, the dough piece tends to slide on the rearward sloping surface of the bar and fall onto the lower conveyor. If the center of gravity of the dough is forward of the elevated portion of the upper surface of the bar, the dough piece tends to slide on the forward sloping surface of the bar before falling onto the lower conveyor. IF the bar is shifted forward, the center of gravity of the dough pieces is always on the rearward side of the bar and substantially spaced apart from the elevation of the bar, thus assuring the fall of the dough piece on the rearward sloping surface of the bar. If the bar is shifted rearward, the dough piece can be assured to fall forwardly of the bar. Again, if the bar is in a cylindrical form and is made to rotate continuously in the forward direction, the dough piece whose center of gravity rides on the forward side of the elevation will surely be carried forward and onto the lower conveyor, whereas the dough piece whose center of gravity rides on the rearward side of the elevation will slide on the rearward side of the cylinder in resistance to the friction with the cylinder because of the gravity of the dough piece itself. In this instance, if the rotation of the cylinder is stopped, the rearward slide of the dough piece will be assured. Again, if the cylinder is made to rotate rearwardly when the dough piece with its center of gravity riding rearwardly of the elevation of the cylinder, the rearward slide of the dough piece will be further assured.

If dough piece is of a configuration such that its center of gravity is spaced from the center between the leading and trailing ends of the dough piece, the bar may be stationary to accomplish the purpose of the present invention if the position of the bar is accurately selected, since those dough pieces whose center of gravity is positioned forwardly of the center of the length and those dough pieces whose center of gravity is positioned rearwardly of the center of the length are separated and sorted out at the elevation of the bar.

If the speed of travel of the upper conveyor is properly selected, the dough piece transported thereon will fall from the curved end portion with the leading end falling substantially in the vertical direction and with the trailing end brought forward because of the centrifugal force imparted thereto by the curved surface of the downstream end portion of the upper conveyor. When the dough piece rides on the bar, it will ride thereon with its leading end on the rearward side and its trailing end on the forward side of the bar. The distance between the bar and the curved end portion is defined with respect to the length of the dough piece in the direction of movement thereof so that the dough piece falling from the upper conveyor can ride on the bar in a manner reversing its orientation.

For a similar reason, when the dough piece falls from the bar onto the lower conveyor, the dough piece tends to reverse its orientation before it lands on the lower conveyor. If the distance between the bar and the lower conveyor is properly selected, the lower end of the dough piece hits the upper surface of the lower conveyor before complete reversal of the orientation takes place and is drawn by the lower conveyor in the direction of its movement. The result is that the dough piece sliding on the forward side of the bar will land on the lower conveyor without reversal of its orientation, while the lower end of the dough piece sliding on the rearward side of the bar will be drawn by the lower conveyor so that the dough piece is caused to again reverse its orientation. Thus, the orientation of the dough piece on the upper conveyor is reversed when it rests on the lower conveyor if the dough piece is made to move on the forward side of the roller, while the orientation of the dough piece which follows the path on the rear side of the roller will rest on the lower conveyor without changing its orientation.

It must also be noted that the conveying speed of the lower conveyor may preferably be substantially higher than the peripheral speed of the roller.

According to an aspect of the present invention, the present invention may involve a cutter means positioned above a first conveyor followed by a second conveyor, whose downstream end forms a curved end portion, from which the dough pieces fall and are treated in the same manner as explained above. According to this aspect of the present invention, a continuous dough sheet is cut into rows of dough pieces with alternately opposite orientation and the rows are separated from each other while being transferred from the first conveyor to the second conveyor, which runs faster than the first conveyor, and the orientation of the rows is adjusted by the downstream means of the present invention so that the orientation of all of the rows are made uniform. According to another aspect of the present invention, any row of the cut dough pieces may be optionally overturned to give appropriate orientation as desired.

In the above embodiment of the present invention, the cutter means is positioned on the upper run of the first conveyor in engagement therewith. Preferably, the cutter means is a rotatable cylindrical cutter provided on the cylindrical surface thereof with blades adapted to successively cut the web on the first conveyor to form two kinds of rows alternatively arranged transversely of the lengthwise direction of the web. Each row may consist of dough pieces independent of each other having the same size and the same orientation, and the dough pieces in alternate rows have opposite orientations to each other.

A support plate may be provided underneath the upper run of the first conveyor to register with the cutter to facilitate cutting of the web of dough.

The second conveyor may be positioned downstream of the first conveyor adjacent thereto to receive the dough pieces cut by the cutter, the conveying speed of the second conveyor being faster than that of the first conveyor. Preferably, the conveying speed of the second conveyor is more than twice that of the first conveyor, so that the dough pieces can be separated from each other by a distance at least equal to the longitudinal length of each piece.

A bar is located beneath said curved end portion to interrupt the path of falling motion of the dough pieces. The bar may be of the same construction and positioned in the same manner as explained hereinabove. The dough pieces which have come into contact with the upper surface of the bar will slide along either the front or rear side portions of the bar as also explained hereinabove.

The third conveyor is positioned under the roller such that the dough pieces falling from the bar may land on the upper run of the third conveyor with the orientation of the dough pieces overturned or unchanged. Preferably, when the bar is in the form of a rotatable roller, it is slowly rotated and the peripheral speed of the roller may preferably be substantially lower than the conveying speed of any of the second and the third conveyors.

In another embodiment of the present invention, regardless of the positions of the center of gravity of the dough pieces cut on the first conveyor from the web, the dough pieces may be arranged to have the same orientation on the third conveyor, by displacing the bar or roller back and forth periodically in a direction substantially parallel to the conveying direction of the dough pieces in timed relation with the falling of the dough pieces from the second conveyor.

The operation of this embodiment is advantageously applicable to the case where the dough pieces have a center of gravity substantially at the center of the length of each dough piece in the direction of advancement thereof, such as where the dough pieces are rectangular.

Further, in order to ensure the desired distribution of the dough pieces to either of the front or rear sides of the bar, it is most preferable to use a bar in the form of a rotatable roller and to rotate the roller in opposite directions periodically about its axis in time relation with the falling of the dough pieces from the second conveyor. Further, the roller may advantageously be driven periodically so as to rotate stepwise in the same direction as the movement of the conveyor above the roller.

When the cut dough pieces are shaped as isosceles triangles or isosceles trapezoids, and all of them are so arranged on the third conveyor that they may have their bases leading in the conveying direction, they may be automatically rolled up by a roll-up device such as a conventional chain-like net to form rolled masses spiraling in cross-section. The roller dough masses may subsequently be processed into croissant-shaped dough products or the like.

BRIEF DESCRIPTION OF THE DRAWINGS

In order that the invention may be more clearly understood, the following description is given by way of example with reference to the accompanying drawings in which.

DESCRIPTION OF PREFERRED EMBODIMENTS

Figure 1:
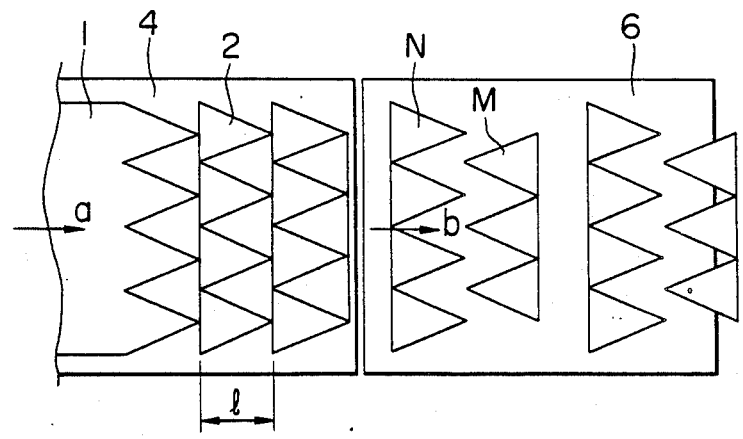
FIG. 1 is a diagrammatic plan view of a pair of conveyors with a web of dough and cut dough pieces to be processed in the device of the present invention.
Figure 2:
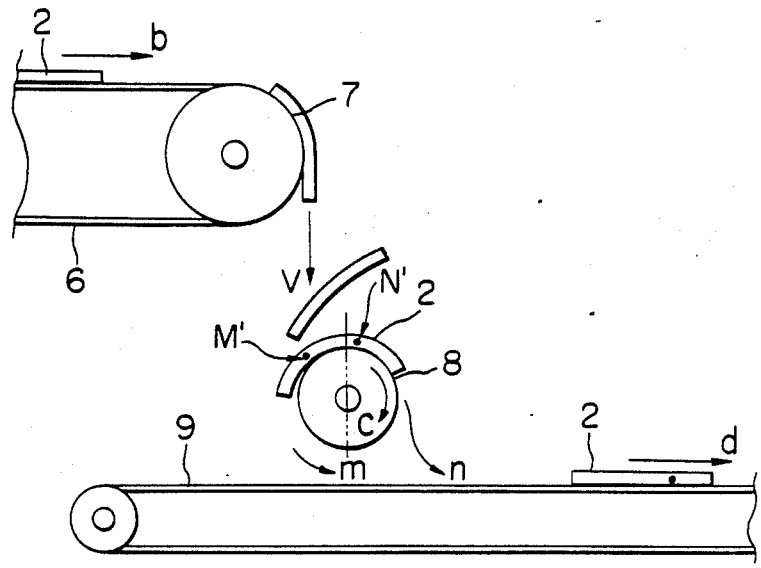
FIG. 2 is a diagramatic side view of an essential part of an embodiment of the present invention, showing movements of cut dough pieces.
Figure 3:
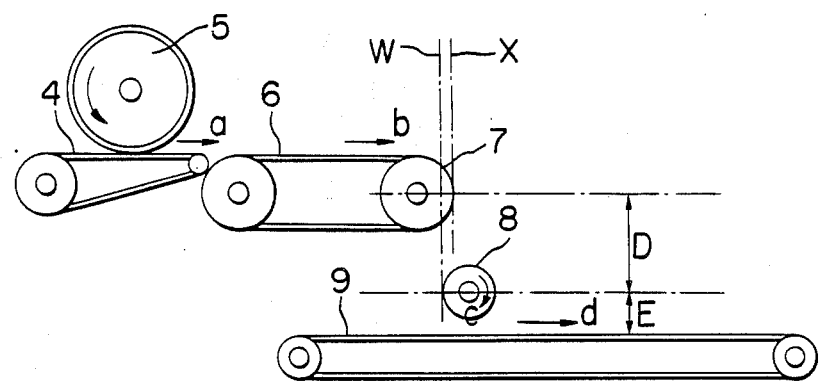
FIG. 3 is a diagramatic side view of various members of an embodiment of the present invention.
Figure 4:
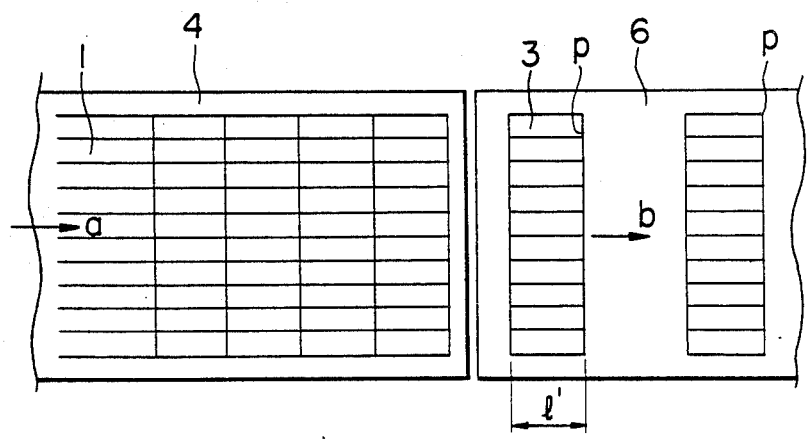
FIG. 4 is a view similar to FIG. 1 with dough pieces cut in rectangles.

In FIGS. 1 to 3, an embodiment of the present invention comprises a first conveyor (4) running in the direction indicated by the arrow (a) for feeding a web of dough (1). The conveyor (4) consists of a conveyor belt supported on two rollers positioned at the forward and rearward ends thereof, at least one of which is driven. The non-driven roller may be substituted with any other suitable support. A cutter (5) is mounted above the first conveyor (4). The cutter (5) is a cylindrical body arranged to continuously rotate about its axis, which is positioned parallel to the axis of the rollers. The cutter (5) is provided around its cylindrical surface with blades arranged to cut the web of dough (1) into dough pieces of desired shapes. To facilitate the cutting operation, a suitable support or base such as an anvil (not shown) may be provided under the upper run of the conveyor (4). The cutter may be provided with blades to cut successively a number of rows of triangular dough pieces (2) with their bases substantially perpendicular to the direction of movement of the web of dough, as shown in FIG. 1. Alternatively, the blades of the cutter may be arranged to cut rectangular dough pieces as illustrated in FIG. 4. Naturally, the arrangement of the blades can be such that dough pieces may be of any shape other than the above. The peripheral speed of the cutter (5) must be arranged so as to be the same as the running speed of the first conveyor (4).

A second conveyor (6) consists of a conveyor belt looped around a pair of rollers provided at the forward and rearward ends thereof, at least one of which is driven. The non-driven roller may be substituted with any other suitable support to provide a curved profile in cross-section. The second conveyor (6) is positioned adjacent the first conveyor (4), downstream thereof, so that the run of the second conveyor (6) may be preferably in alignment with that of the first conveyor (4). The second conveyor (6) can thus smoothly receive cut dough pieces from the first conveyor (4) and convey them in the direction shown by the arrow (b). The second conveyor (6) is made to run faster than, desirably at least twice as fast as, the first conveyor (4). It is apparent therefore that the rows of the cut dough pieces can be separated from each other, when the rows are transferred from the first conveyor (4) onto the second conveyor (6). The second conveyor (6) terminates at its downstream end at a curved end portion (7). The portion (7) is formed in the embodiment with the forward end surface of the forward roller and the conveyor belt passing thereover.

The rows of dough pieces (2) on the second conveyor (6) fall successively off the curved end portion (7) with the progress of the conveyor belt around the surface of the forward roller.

A bar or roller (8) is rotatably beneath the curved end portion (7) so as to continuously rotate about its axis in the direction shown by the arrow (c). The peripheral speed of rotation of the roller (8) is preferably slower than the running speed of the second conveyor (6). The axis of the roller (8) is positioned horizontal and is parallel to a vertical plane (X) which is tangent to the forward extremity of the curved end portion (7). The plane (X) slightly intersects the cylindrical body of the roller (8) as shown in FIG. 3. A plane (W) is a vertical plane tangent to the rearward end of the cylindrical body of the roller (8). These planes (X) and (W) are for illustrating the positioned relationship between the forward extremity of the curved end portion (7) and the rearward extremity of the cylindrical body of the roller (8). Further, the roller (8) is positioned so that the distance (D) between the level of the horizontal axis of the roller (8) and that of the point of contact of the vertical plane (X) with the forward extremity of the curved end portion (7) may preferably be greater than the length (1) of the dough piece (2) in the direction of movement thereof.

In case triangular dough pieces are processed, each row of the triangular dough pieces (2) cut out of the dough piece (1) by the cutter (5) is arranged such that dough pieces (M) with their bses directed forwardly may alternate with dough pieces (N) with their bases directed rearwardly. It will be readily understood that when a row of triangular dough pieces (2) advance from the first conveyor (4) onto the second conveyor (6), dough pieces (M) will be pulled by the second conveyor (6) faster than dough pieces (N) due to the difference of the running speeds between the first and second conveyors and the difference in friction between dough pieces (M) and dough pieces (N) with the second conveyor (6). If the running speed of the second conveyor (6) is properly arranged relative to that of the first conveyor (4), dough pieces (M) are sufficiently separated from dough pieces (N) in the direction of advancement, as seen in FIG. 1. The reasons for sufficiently separating the rows of dough pieces from each other will be explained later.

As shown in FIG. 2 when the triangular dough pieces (2) are about to fall from the curved edge portion (7) of the second conveyor (6), the leading end portions of the pieces (2) depend therefrom substantially in the vertical direction shown by the arrow (V), regardless of whether the dough pieces (2) are of the row (M) or the row (N). As the falling action continues, the gravity of each dough piece (2) overcomes the frictional resistance produced between the piece (2) and the curved plane of the end portion (7) of the second conveyor (6), and thus the dough piece (2) slides on the curved surface while being advanced by the second conveyor, to fall downwardly with an accelerated speed. The accelerated falling motion will increase the centrifugal force generated on the trailing end portion of the dough piece (2) when it moves around the curved surface of the end portion (7), and thus the trailing end portion will be effectively urged away from the curved surface of the end portion (7) to fall while forwardly inclining away from the vertical direction (V), while the leading end portion of the piece (2) progresses substantially vertically. The trailing end portion of the dough piece (2), while falling, is subjected to an inertial force acting in the forward direction in addition to being subjected to a gravitational force. Thus, the falling dough piece (2) will assume temporarily a substantially horizontal position where the dough piece reverses its orientation relative to its initial position. Specifically, the aforesaid distance (D) or the level of the roller (8) relative to the curved end portion (7) is selected such that the falling dough piece will hit the cylindrical upper surface of the roller (8) with the piece being overturned. Hereupon, if the running speed of the second conveyor (6) is sufficiently faster, at least more than twice that of the first conveyor, and therefore the rows of dough pieces are sufficiently separated on the second conveyor from each other, it will be noted that each of the falling dough pieces will not overlap the adjacent dough pieces on the cylindrical surface of the roller (8), under the condition that the peripheral speed of the roller is properly adjusted.

A third conveyor (9) is located below the roller (8) to receive the dough pieces (2) which fall from the second conveyor (6) and convey them away. In the accompanying drawings, the third conveyor (9) is illustrated to consist of a conveyor belt looped around a pair of rollers. The third conveyor (9) is arranged to travel faster than the peripheral speed of rotation of the roller (8). The position of the third conveyor (9) is defined so that the distance (E) between the level of the horizontal axis of the roller (8) and the upper surface of the third conveyor (9) may be smaller than the length (1) of the dough piece (2). The reasons for defining the position of the third conveyor (9) as such will be understood from the description which will be made later.

When the dough pieces (2) hit the cylindrical surface of the roller (8) during their falling motion, the dough pieces (M) slides therealong in the direction opposite to the direction of rotation of the roller (8) following a path as indicated by the arrow (m) shown in FIG. 2, because the center of gravity (M′) of the dough piece lies substantially on the rear side of the roller (8), and then ride on the surface of the third conveyor (9) with their orientation again being reversed, since the third conveyor runs in the direction shown by the arrow (d). As to the dough pieces (N), they progress in the direction of rotation of the roller (8) through a path indicated by the arrow (n), because the center of gravity (N′) is positioned on the front side of the roller (8), and then ride on the third conveyor (9) without changing again their orientation, since the third conveyor runs in the direction shown by the arrow (d). Specifically, the aforesaid distance (E) or the level of the roller (8) relative to the surface of the third conveyor (9) is selected such that the above-mentioned transfer of the dough pieces from the roller (8) onto the third conveyor (9) can be attained.

Thus, if the dough pieces are in the form, for instance, of triangle whose center of gravity is positioned a substantial distance from the center of the length (1), it will be readily understood that they can all be carried away by the third conveyor (9) in the positional arrangement following the initial pattern of arrangement of the dough pieces (M). The same will apply to trapezoidal dough pieces or dough pieces of any other form whose center of gravity is removed from the center of the length.

The forward rotational movement of the roller (8) may preferably be stopped when the dough piece (2) rides on the roller with its center of gravity positioned on the rearward side of the roller. Again, it is also preferably to reverse the rotational movement of the roller in such instance. Thus, the roller may be intermittently rotated or alternately rotated back and forth.

The following description will now be made with respect to the second embodiment of the present invention.

According to this embodiment, it is possible to have all the dough pieces arranged on the third conveyor (9) in the same orientation as that of the row (N). Also, it is possible to optionally select the orientation on the third conveyor of the dough pieces cut in rectangles as shown in FIG. 4, which pieces have the center of gravity approximately at the center of their lengths (1′) in the direction of movement thereof. The operation of this embodiment will be explained in detail with reference to FIGS. 5, 6 and 7.

A vertical plane (R) is illustrated as extending tangentially from the forward extremity of a second conveyor (16). A vertical plane (S) is illustrated as extending tangentially from the rearward end of a roller (10). However, the roller (10) is shifted away from the vertical plane (R). A vertical plane (T) shows a similar tangential plane, when the roller (10) is swung rearwardly so as to intercept the plane (R).

Figure 5:
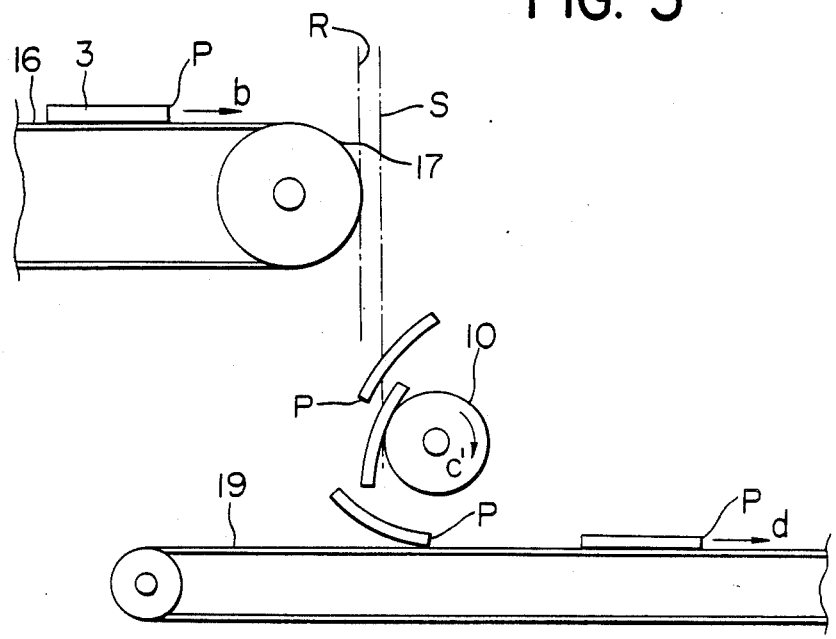
FIG. 5 is a diagramatic side view of an essential part of another embodiment of the present invention, with a roller in a certain position.

When it is desired to have the leading end (P) of each dough piece (3) on the second conveyor (16) located in the same orientation on a third conveyor (19), the roller (10) is shifted such that the vertical plane (S) is positioned slightly forwardly of the plane (R) as shown in FIG. 5. The dough piece (3) falling from the second conveyor (16) passing around the curved end portion (17) will hit the rearward side of the body of the roller (10) rotating about its axis in the direction (c') with its orientation being reversed during its falling motion, and the trailing end portion of the dough piece (3) is bounced back by the cylindrical surface of the roller (10) due to the centrifugal force of the roller (10). Then, the dough piece (3) falls successively to ride on the third conveyor (19) where the leading end (P) of the dough piece will still be leading, the reason of which will be readily understood by the illustration made regarding the first embodiment.

Figure 6:
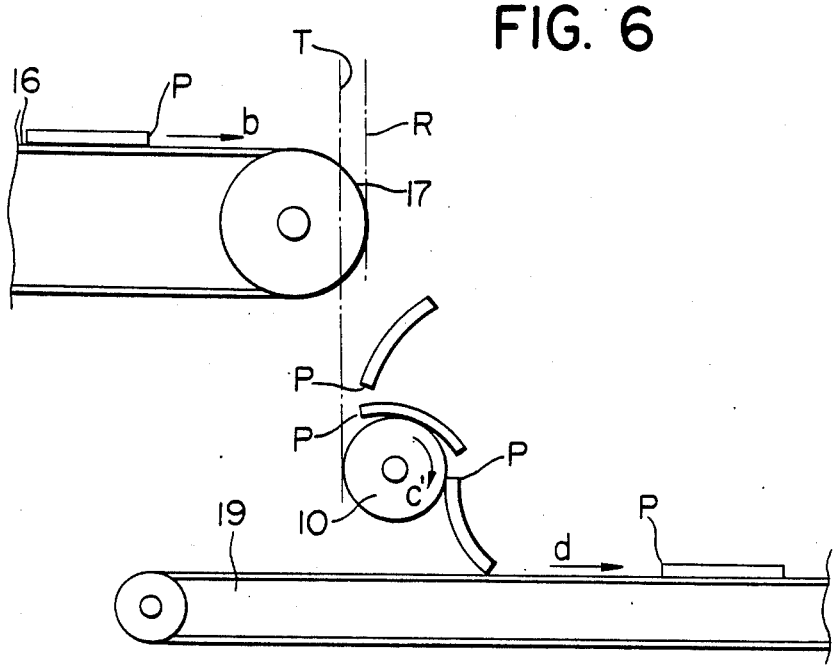
FIG. 6 is a view similar to FIG. 5, with the roller in a position different from that in FIG. 5.

When it is desired to position the dough piece (3) so that the leading end (P) on the second conveyor (16) is made to be the trailing end on the third conveyor (19), the position of the roller (10) is shifted so that the surface of the roller (10) is made to intersect the plane (R) as shown in FIG. 6. Then, the dough piece (3) from the second conveyor (16) will be pulled in the direction of the arrow (c') by the rotation of the roller (10) when the piece hits the cylindrical surface of the roller, and thereafter the dough piece is carried away by the third conveyor (19) with its trailing end on the second conveyor (16) being positioned in the front of the dough piece in the conveying direction (d) of the third conveyor (19).

As is apparent from the above explanation, the orientation of the dough pieces can optionally be reversed by imparting reversing action once or twice to the dough pieces according to the shifted positions of the roller (10).

Figure 7:
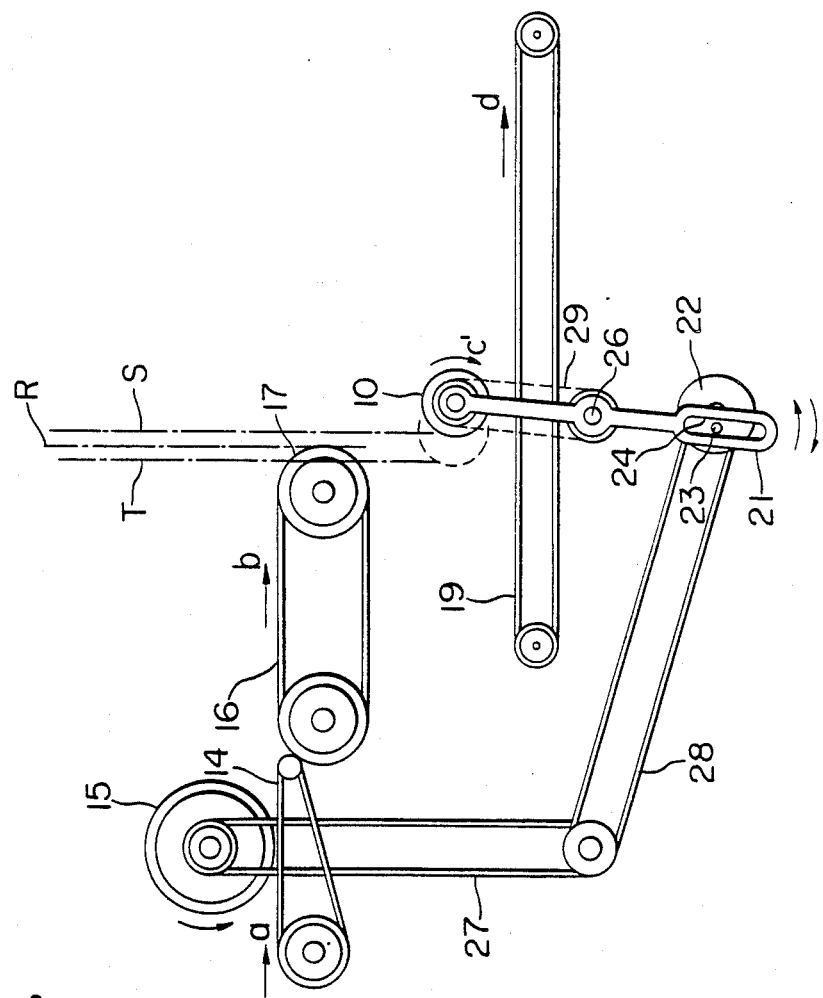
FIG. 7 is a diagramatic side view of various members of an embodiment of the present invention, showing a transmission mechanism in which the roller to receive falling dough pieces is displaced synchronously with the rotation of a cutter.

If it is desired to perform such reversing action periodically, such can be attained by setting the rotation of a cutter (15) which corresponds to the cutter (5) mentioned in the first embodiment, in timed relation with the shifting device of the roller (10) at calculated time intervals. Synchronization can be attained by such a transmission mechanism as shown diagramatically in FIG. 7. The transmission mechanism comprises a rod (21) which is connected to the shaft of the roller (10) at an end thereof and a crank assembly at the other end thereof, and a chain gearing connecting the crank assembly and the cutter (15). The crank assembly comprises a disc (22) which is rotatably fixed to the frame of the apparatus, a crank pin (23) mounted eccentrically thereon, and an elongate slot (24) which is formed at said other end of the rod (21) to engage the crank pin (23) whereby a crank effect is imparted to the rod (21). The roller (10) in FIG. 7 is adapted to be swung by the rod (21) about a fulcrum (26) positioned between the opposite ends of the rod thereby to cause the rear end of the roller (10) to reciprocate between positions on planes (S) and (T). Chains (27) and (28) connect the shaft of the cutter (5) with that of the disc (22). Thus, according to the transmission mechanism, it will be readily understood that if the mechanism is suitably adjusted, the cutting operation of the blades of the cutter (15) can be made to synchronize with the desired reciprocation of the roller (10). A chain (29) is looped around a pair of gears which are fixedly mounted on the roller (10) and freely rotatably mounted on a shaft forming the fulcrum (26), respectively, and is adapted to rotate the roller (10) about its axis by a drive source not shown, independently of the transmission mechanism.

According to the second embodiment described above, it will be noted that regardless of the position of the center of gravity of the cut dough pieces, the dough pieces may be arranged to have optionally selected orientation on the third conveyor.

Referring to FIGS. 2, 5 and 6, in order to ensure the desired distribution or sorting of the dough pieces to either of the front or the rear sides of the roller (8 or 10), it is most desirable to rotate the roller alternately in opposite directions about its axis, so that the roller (8 or 10) may always rotate in the same direction as that of the movement of the dough pieces along the cylindrical surface of the roller. Specifically, when the dough pieces are to be moved to the forward side of the roller (8 or 10), the roller is driven to rotate in the direction shown in FIGS. 2 and 6 of the drawings, and when the dough pieces are to be moved to the rearward side of the roller, the roller is driven to rotate in the direction opposite to that shown in FIGS. 2, 5 and 6 of the drawings.

It is especially desirable to rotate the roller in opposite directions when the rows of dough pieces conveyed consist of harder dough pieces. When the dough pieces are soft, they tend to fall from the curved end portion of the second conveyor in the vertically downward direction, while, if dough pieces are hard, they tend to be thrown in the forward direction so that they will fall at a point forwardly of the point where soft dough pieces tend to fall. Therefore, it is advantageous in the embodiment of FIG. 2 to rotate the roller in the direction opposite to the direction (c) in FIG. 2 when the row (M) of hard dough pieces are to be processed so as to maintain their original orientation also on the third conveyor, in which case the dough pieces will move more assuredly in the direction (m). The direction of rotation of the roller may preferably be in the direction (c) as shown in FIG. 2 when the row (N) of harad dough pieces are to be processed so as to reverse their original orientation when landed on the third conveyor. Similar arrangements can be made in the embodiment of FIGS. 5 and 6.

Also, the third conveyor (9 or 19) may be advanced in the direction opposite to the direction (d) shown in the drawings.

What is claimed is:

1. An apparatus for producing a plurality of dough pieces of the same orientation from a web of dough, comprising:

a first conveyor for conveying the web;

cutting means for cutting the web on the first conveyor into rows of dough pieces so that the rows are arranged transversely of the lengthwise direction of the web and the dough pieces are independent of each other with the same size and the same orientation in each row;

a second conveyor adapted to receive the rows from said first conveyor and to separate them form each other, the second conveyor terminating at its downstream end at a curved end portion;

a third conveyor positioned below said second conveyor; and means, including a roller positioned between said second and third conveyors, for receiving dough pieces overturning as they fall from the curved end portion of said second conveyor and permitting the dough pieces to fall from one side of said roller when a first orientation of the dough pieces is desired and to fall from the outer side of said roller when a second orientation of dough pieces is desired.

2. An apparatus for selectively determining the orientation of dough pieces, comprising:

an upper conveyor for conveying dough pieces supplied thereon, said conveyor terminating at a curved end portion at the downstream end thereof;

means, including a bar provided below said curved end portion and presenting an upper surface elevated in the center with downwardly sloping surfaces on respective sides, for receiving the dough pieces overturning as they fall from the upper conveyor and permitting them to move down along either of said sloping surfaces depending on the relationship between the center of gravity of the dough pieces and the location of said bar; and a lower conveyor located under said bar at such a vertical position that the dough pieces falling from said bar land on the lower conveyor with the orientation reversed or unchnaged depending upon which of said sloping surfaces of the bar they move along.

3. An apparatus according to claim 2, in which the bar is driven to rotate alternately in the direction of movement of the upper conveyor when the dough piece rides on the forward side of the bar and in the direction opposite thereto when the dough piece rides on the rearward side of the bar.

4. An apparatus according to claim 2, in which the bar is a cylinder.

5. An apparatus according to claim 2, which the bar is a roller.

6. An apparatus according to claim 2, in which the bar is a roller or a cylinder adapted to the driven to constantly rotate about its axis in the same direction as that of movement of the upper conveyor.

7. An apparatus according to claim 2, in which the bar is a roller or a cylinder adapted to be driven to intermittently rotate about its axis in the same direction as that of movement of the upper conveyor, such that the roller or the cylinder rotates when the dough piece rides on the forward side thereof and stops when the dough pieces rides on the rearward side thereof.

8. An apparatus according to claim 2, in which the bar is displaced alternately back and forth in a direction substantially parallel to the coveying direction of the dough pieces such that the bar is displaced in the rearward direction when the dough piece rides on the forward side of the bar and the bar is displaced in the forward direction when the dough piece rides on the rearward side of the bar.

9. An apparatus according to claim 8, in which the bar is a cylinder.

10. An apparatus according to claim 8, in which the bar is a roller.

11. An apparatus according to claim 9 or 10, in which the roller or the cylinder is driven to constantly rotate about its axis in the same direction as that of movement of the upper conveyor.

12. The apparatus according to claim 9 or 10 in which the roller or the cylinder is driven to rotate in the direction of movement of the upper conveyor when the roller or the cylinder is moved rearwardly and is driven to rotate in the opposite direction when the roller or the cylinder is moved forwardly.

13. An apparatus for selectively determining the orientation of dough pieces comprising:

an upper conveyor for conveying dough pieces lying in a first or second orientation, said upper conveyor terminating at a curved end portion at the downstream end thereof;

means, including a member provided below said curved end portion and presenting an upper surface elevated in the center with downwardly sloping surfaces on respective sides, for receiving dough pieces overturning as they fall from the upper conveyor and permitting them to move downwardly along one of said sloping surfaces when a first orientation is desired and permitting them to move downwardly along the other sloping surface when a second orientation is desired; and a lower conveyor positioned under said member for receiving dough pieces falling form said member with the orientation reversed or unchanged depending upon which sloping surface of the member they move along.

14. A method for orientating a plurality of dough pieces in the same direction, comprising the steps of:

conveying dough pieces lying in a first or second orientation along a conveyor terminating in a curved end portion at the downstream end thereof;

receiving said dough pieces on a member provided below said curved end portion, said member presenting an upper surface elevated in the center with downwardly sloping surfaces on respective sides, with the dough pieces being overturned as they fall from the upper conveyor to permit said dough pieces to move downwardly along one of said sloping surfaces when a first orientation is desired and to permit them to move downwardly along the other sloping surface when a second orientation is desired; and receiving said dough pieces falling from said member with the orientation reversed or unchanged depending upon which sloping surface of the member they move along on a lower conveyor positioned under said member.

* * * * *